(12) United States Patent
Harrison et al.

(10) Patent No.: US 6,418,212 B1
(45) Date of Patent: Jul. 9, 2002

(54) TELEPHONE FRAUD DETECTION AND PREVENTION

(75) Inventors: Anna L. Harrison, Littleton, CO (US); Erin C. Jackman, Petaluma, CA (US); Dean Marchand, Brighton, CO (US)

(73) Assignee: MCI WorldCom, Inc., Jackson, MS (US)

( * ) Notice: Subject to any disclaimer, the term of this patent is extended or adjusted under 35 U.S.C. 154(b) by 0 days.

(21) Appl. No.: 09/458,225

(22) Filed: Dec. 9, 1999

(51) Int. Cl.[7] .............................................. H04M 3/38
(52) U.S. Cl. ..................... 379/189; 379/191; 379/196
(58) Field of Search .................................. 379/188, 189, 379/190, 191, 196, 197, 198, 199, 200

(56) References Cited

U.S. PATENT DOCUMENTS 5,809,125 A * 9/1998 Gammino .................... 379/189

* cited by examiner

Primary Examiner—Harry S. Hong

(57) ABSTRACT

A system and method for detecting and preventing a fraudulent telephone call in telecommunication system is provided. First, a terminating number of a first call and a originating number of a second call are received from a telecommunication network. The terminating number of the first call is compared with the originating number of the second calls which are originated within a predetermined time period from a termination of the first call. After comparison, it is determined whether the first and the second calls are fraudulent telephone call.

18 Claims, 6 Drawing Sheets

| No. | Date /401 | Time /403 | Billed Number /405 | Originating Number /407 | Terminating Number /409 |
|---|---|---|---|---|---|
| 1 | 6/1 | 12:00 | 48392019384750 | 213-320-1029 | 214-555-1212 |
| 2 | 6/1 | 12:00 | 21345839485900 | 212-210-9182 | 515-565-5500 /411 |
| 3 | 6/1 | 12:00 | 28953484729489 | 718-778-9324 | 91-1888-1234 |
| 4 | 6/1 | 12:00 | 515-565-5500 | 515-565-5500 \413 | 86-591-19384944 |

TELEPHONE FRAUD DETECTION AND PREVENTION

TECHNICAL FIELD

The present invention relates generally to a telecommunication system and more particularly to a method and system for detecting and preventing a fraudulent telephone call based on call record data.

BACKGROUND OF THE INVENTION

In a telecommunication dependent society, fraudulent telephone calls have increased to the levels where they are a problem to both telephone service providers and legitimate customers. Fraudulent telephone call activities include calling card fraud, Private Branch Exchange (PBX) fraud, fraudulent call forwarding, looping, hacking, etc. Fraudulent telephone calls often entail the unauthorized use of telephone billing numbers such as originating telephone numbers, calling card numbers and credit card numbers, which are associated with customer billing accounts for legitimate customers. If the telephone service provider charges fraudulent calls to a legitimate customer, the customer often complains about the bill.

Telephone service providers generally absorb the costs for these fraudulent calls in order to maintain good relationships with their customers. As such, telephone service providers have attempted to receive and prevent such fraudulent calls. In conventional systems, fraudulent calls have been identified by manually monitoring call record data to detect fraudulent calling patterns. The call record data may include an originating telephone number, a terminating telephone number, a billed number, the time of each call, etc. The conventional method of manually monitoring the call record data for detecting and preventing fraudulent calls is labor intensive, costly and time-consuming. In addition, fraudulent calling patterns can generally only be identified a substantial time after the occurrence of fraudulent calls in a conventional method and system for detecting fraudulent calls.

SUMMARY OF THE INVENTION

The present invention provides a method and system for automatically detecting and preventing a fraudulent telephone call through the review of telephone call record data. More particularly, the present invention provides a method and system for detecting and preventing call looping. In order to detect and prevent the call looping, the present invention detects potential fraudulent telephone call patterns by comparing the terminating telephone number of a first call with the originating telephone number of a second call.

Another object of the present invention is to provide a method and system for a real time detection and prevention of fraudulent telephone calls. According to the present invention, the terminating telephone number of a first call is compared with the originating telephone number of a second call which is originated within the predetermined time period from the first call. Generally, the second call is originated substantially at the same time as the termination of the first call.

In accordance with one aspect of the present invention, a method for detecting and preventing a fraudulent telephone call in a telecommunication system is provided. First, the terminating number of a first call and the originating number of a second call are received from a telecommunication network. The terminating number of the first call is compared with the originating numbers of the second calls, which are originated within a predetermined time period from the first call. After comparison, it is determined whether the first and the second calls correspond to a fraudulent telephone call looping to circumvent blocks set forth by the exchange carriers.

In accordance with another aspect of the present invention, a security system for detecting and preventing a fraudulent telephone call is provided. The security system receives the terminating number of a first call and stores it in a storage element. The security system includes a timer which calculates a predetermined time period from the first call. The security system also receives the originating number of a second call which is originated within the predetermined time period set forth by the timer. The security system compares the terminating number of the first call with the originating number of the second call to determine whether or not the first and the second calls correspond to a fraudulent call pattern.

The present invention can be applied to various telecommunication systems to detect telecommunication fraud. The present invention can also be applied to security monitoring systems to detect an unauthorized access to a target system. Furthermore, the present invention can be applied to a real time fraud monitoring system. As a result, the present invention provides an up-front automated detection method and system for detecting call-looping abuse.

BRIEF DESCRIPTION OF THE DRAWINGS

An illustrative embodiment of the present invention will be described below relative to the following drawings.

DETAILED DESCRIPTION OF THE INVENTION

The illustrative embodiment of the present invention concerns a telephone call fraud detection technique that utilizes call record data, including originating telephone numbers, terminating telephone numbers, billed numbers and the time of the calls. In particular, the illustrative embodiment of the present invention provides a method and system for detecting and preventing call looping fraud where calls are looped to circumvent blocks set forth by exchange carriers. A call looping fraud pattern is identified by comparing the terminating telephone number of a first call with the originating telephone number of second calls that are originated within a predetermined time period after the first call terminates.

The terminating telephone number of the first call and the originating telephone number of second call are retrieved from a call record database in the exchange network. The illustrative embodiment of the present invention also employs an exempted number database for storing telephone numbers which are exempted from a fraudulent call looping pattern. The exempted number database can be provided to prevent legitimate calls from being identified as fraudulent calls. The illustrative embodiment also includes a blocking mechanism such that if a call is attempted to a telephone number previously determined to be a part of a fraudulent call pattern, a block is instituted to block the attempted fraudulent call in real time.

As a result, the illustrative embodiment provides an effective call fraud detection method and system by automatically reviewing call record data to locate a fraudulent call patterns, including call looping fraud patterns. The present invention can be applied to a security monitoring system to detect an unauthorized access to a target system as well as to a telecommunication system to detect a telecommunication fraud.

Figure 1:
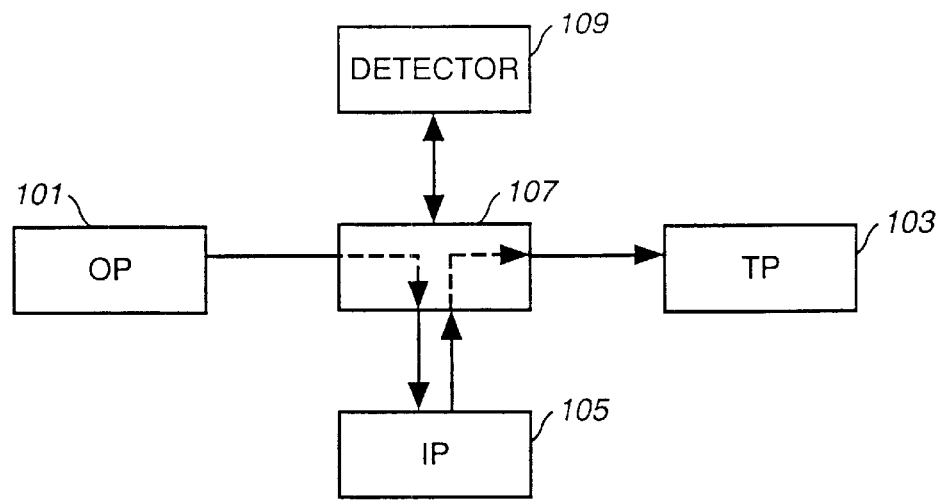
FIG. 1 is a block diagram which illustrates call looping and the detection of the call looping according to the present invention.

FIG. 1 is an example of a block diagram which illustrates call looping and the detection of call looping according to the illustrative embodiment of the present invention. FIG. 1 shows an originating party (OP) 101 and a terminating party (TP) 103 that are interconnected with each other through a network 107, such as a telephone network. The exchange carrier puts blocks in the network to protect against a fraudulent call originated from the originating party to the terminating party. The blocks attempt to prevent the originating party from calling the terminating party. Blocks may be associated with a geographical location of the originating party, and the geographical location of the terminating party; a combination of both originating/terminating locations; and/or may be switch based.

Looping is a method which perpetrators, such as hackers, use to circumvent such blocks that a telephone service provider puts into the network to control fraudulent telephone calls. The perpetrators may also use the looping to hide or avoid detection of their origination number. Looping may be realized through several types of devices, such as a Private Branch Exchanges (PBXs), cellular phones or telephones that are call forwarded to an access number. These devices can originate a second call while keeping a first call on the line. The call looping perpetrators may loop calls through one carrier, or they may loop calls through multiple carriers. Looping may take many forms and may use different billing products. The end result is to by-pass the block and/or to make difficult to identify the origination point.

As shown in FIG. 1, in a typical looping transaction, the originating party 101 places a first call to an intermediate party (IP) 105 in order to circumvent blocks set forth in the network 107 against fraudulent calls originated from the originating party 101 to the terminating party 103. The intermediate party 105 includes a call-origination device, such as a private branch exchange (PBX), a cell phone service or a call forwarding telephone. If the originating party 101 can access the call-origination device of the intermediate party 105, the originating party 101 can place a second call on the call origination device to the terminating party 103 while staying on the first call.

The detector 109 provided by the embodiment of the present invention operates on the call record data from the network 107 to detect a potential fraudulent call. The call record data is substantially generated by normal call processing in the network. Switching nodes and other intelligent nodes may generate the call record data. If a first call originates from the originating party 101 to the intermediate party 105, the detector 109 receives a terminating number of the first call that is stored in call record database of the network 107. Additionally, if the second call originates from the intermediate party 105 to the terminating party 103, the detector 109 also receives an originating number of the second call from call record database in the network 107. The second call is originated within a predetermined time period from the first call. If the terminating number of the first call is identical to the originating number of the second call, the first and the second call may be determined to be a fraudulent call. When a fraudulent telephone call is detected in the exchange network 107, the detector 109 notifies the exchange network 109 of the fraudulent call looping.

Figure 2:
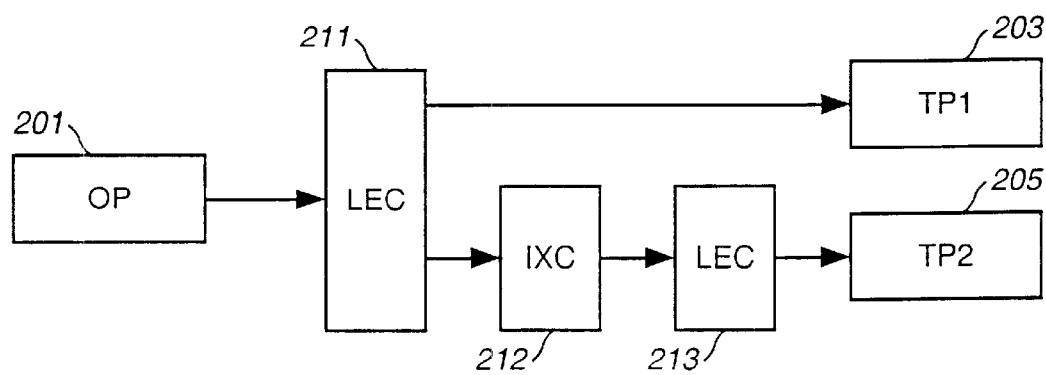
FIG. 2 is a block diagram which illustrates an exemplary configuration of the exchange network shown in FIG. 1

FIG. 2 is a block diagram which illustrates an exemplary configuration of the network 107 between the originating party and the terminating party shown in FIG. 1. The network includes a telephone unit 201 of an originating party (OP), a telephone unit 203 of a local terminating party (TP1), a telephone unit 205 of a long distance terminating party (TP2), local exchange carriers (LECs) 211 and 213, and an interexchange carrier (IXC) 212. The originating party and the local terminating party subscribe to a same LEC 211 while the long distance terminating party subscribes to a different LEC 213. The telephone units 201 and 203 of the originating party and the local terminating party are connected to switches in the switching office of the LEC 211 via transmission lines. Similarly, the telephone unit 205 of a long distance terminating party is also connected to a switch in the switching office of the LEC 213 via transmission lines. The LEC 211 and LEC 213 are interconnected with each other via an interexchange carrier (IXC) 212, which provides long distance service.

The LEC 211 generally routes a local call which originates from the originating party to the local terminating party. The local call is routed by one or more switches in the switching office of LEC 211, which switches or switch the transmission lines which run to the telephone units 201 and 203 of the originating party and the local terminating party. In addition, the LEC 211 routes a call which originates from originating party to a long distance terminating party. When the originating party places a long distance call which is directed to the terminating party, the call is forwarded to a switch in the switching office of the originating LEC 211. The originating LEC 211 determines which IXC is designated to the call placed on the telephone unit 201 of the originating party, and queries the IXC 212 whether the IXC 212 can handle the call. The query passes with information about the call, such as an originating number, a terminating number and a billing number in order to properly route and bill the call. If the IXC 212 can handle the call, the originating LEC 211 forwards the call to the IXC 212 with the call information, which is stored in the call record database. After determining the availability of the terminating telephone number, the IXC 212 forwards the call to the terminating LEC 213, and the call is consequently routed to the telephone unit 205 of the long distance terminating party with automatic number identification (ANI) information. If the terminating party has a device to decipher the ANI information, the originating number or originating identification can be displayed on the screen of a telephone unit in the terminating party. As a result, the originating party and the terminating parties are interconnected with each other through the exchange network 107.

Figure 3:
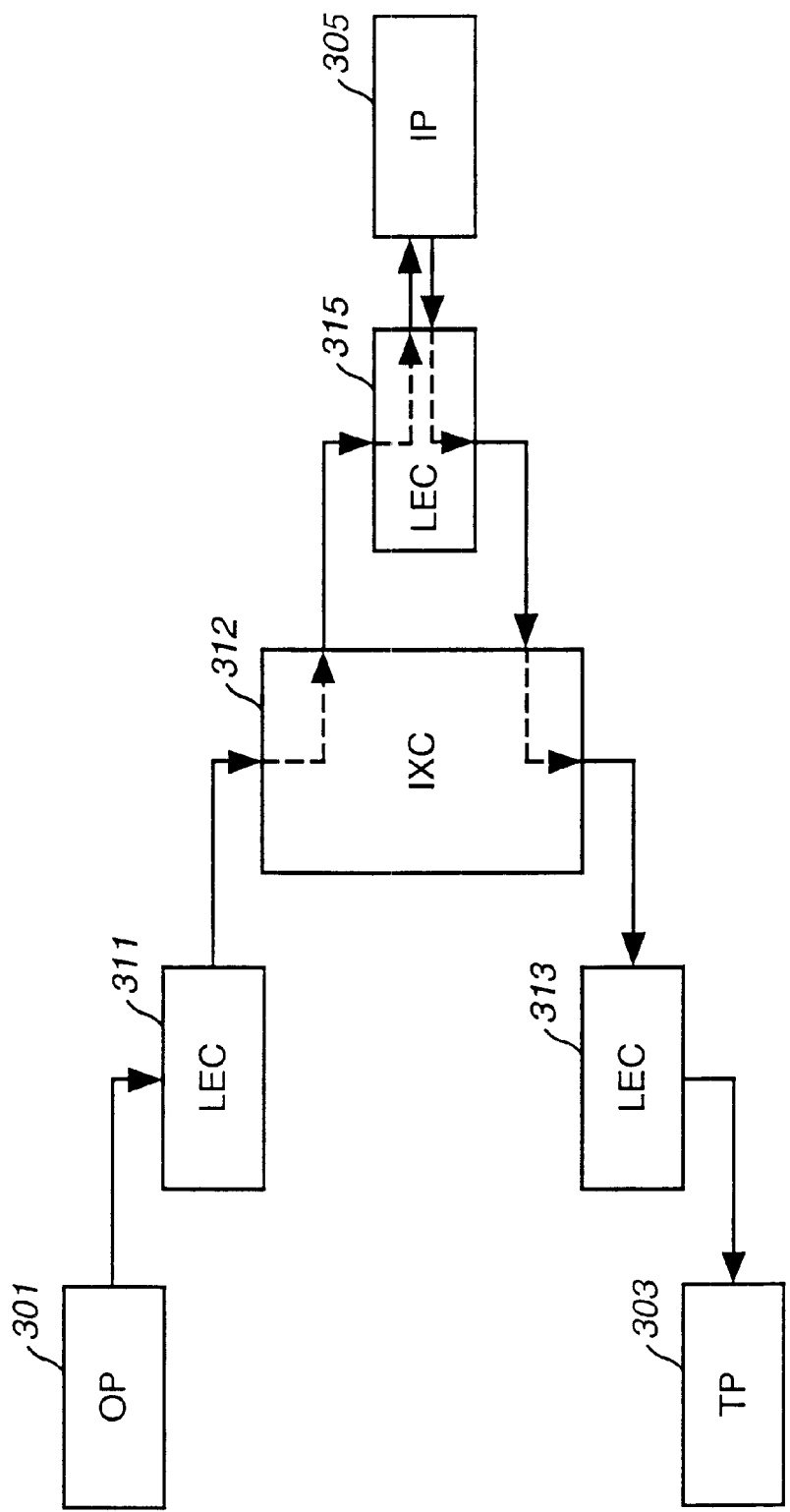
FIG. 3 is a block diagram which illustrates an example of call looping to an international termination where the illustrative embodiment of the present invention is applied.

FIG. 3 is an example of a block diagram which illustrates call looping to an international termination. An originating party 301 is geographically located, for example, in New York and wishes to place a call to an international destination using a stolen calling card. Generally, long distance providers put blocks in their networks to block fraudulent calls originating from a large city, such as New York, to international destination in order to prevent a revenue loss. Since the long distance carrier may have put blocks in their network to protect against international termination calls using the stolen calling card provided by the long distance provider, the originating party 301 places a domestic termination call using the stolen calling card to loop blocks set forth by the long distance provider.

The origination party 301 places the domestic termination call to an intermediate party 305, such as a business in Iowa, in order to loop around the blocks. The call is forwarded to the switching office of the originating LEC 311 in New York. After examining the designated IXC 312 to handle the first call, the originating LEC 311 in New York forwards the first call to the IXC 312. Call information, including an originating number, a termination number, and a billed number, is forwarded along with the call. The call information is contained in one or more call records which are stored in the call record database. After the IXC 312 determines the availability of proper lines and switches to the intermediate party 305, the IXC 312 forward the call to a terminating LEC 315 in Iowa. The terminating LEC 315 completes the first call by connecting the first call to the intermediate party 305.

If the business in Iowa, the intermediate party 305, includes a call origination device (such a PBX equipment, a cell phone or a call forwarding telephone) the originating party 301 can loop the first call to a desired destination via the call origination device at the intermediate party 305. In particular, the originating party 301 places a second call to an international termination using the call origination device. Assuming that the call origination device is a private branch exchange (PBX), the PBX switches and routes calls internally, routes calls externally and provides a dial tone to the internal users of the intermediate party 305. If the originating party 301 can access the PBX system of the intermediate party 305, the originating party 301 is able to dial 9 for external termination of the PBX. If the originating party 301 dials 00 for the long distance operator, the originating party 301 can make a call to an international termination. In this case, the second call (i.e. the international call) is billed to the number from which the second call originates (i.e. the number of the PBX at the intermediate party 305).

The individual skilled in the art will appreciate that the call origination device need not be a PBX equipment, a cell phone or a call forwarding telephone; rather the device can be any device which can grab the originating party from the first call and keep the originating party of the first call as an originating party 301 for a second call originating from the device.

The second call originates from the call origination device of the intermediate party 305 and is forwarded to the intermediate LEC 315 in Iowa. Since the IXC 312 has fewer blocks on the originating location of Iowa for international termination calls, this second call has a higher probability of success than a fraudulent call originated from New York. After the examination, the LEC 315 in Iowa forwards the second call to the IXC 312 with call information, including originating number, terminating number and billed number, which are stored in the call record database as shown in FIG. 3. The IXC 312 receives a second call from LEC 315 in Iowa and determines that the proper lines and switches are available along the call path to the terminating telephone number. After the determination, the IXC 312 forwards the call with terminating telephone number to the foreign exchange carrier 313, which routes the second call to a foreign party 303.

Figures 4, 5:
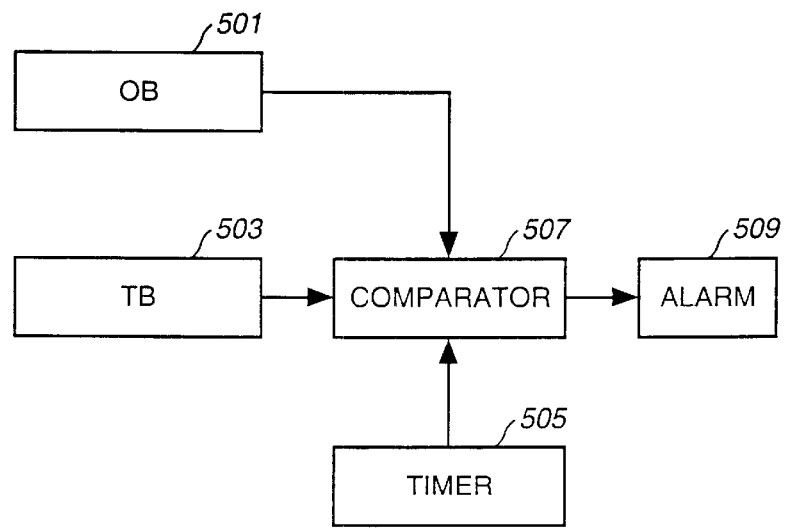
FIG. 4 is an example format of call record data which is used in the illustrative embodiment of the present invention.
FIG. 5 is block diagram which illustrates a detector of call looping using a call origination.

FIG. 4 is an example of call record data which is used in the embodiment of the present invention. The exchange network creates call record data for each call and the call record data is stored in a storage element of the network. The call record data generally includes date 401 and time 403 at which the call originates. In particular, the call record data includes a billed number 405, an originating number 407 and a terminating number 409. The billed number 405 is the account number charged for the telephone call. The billed number 405 may include a calling card number, credit card number, originating telephone number, terminating telephone number, etc. In normal residential dialing, the originating telephone number is identical to the billed number such as in call record No. 4 of FIG. 3. The illustrative call record data in FIG. 4 shows several phone calls over a short period of time. Call record No. 2 shows a call originated from an originating party at 212-210-9182, to an intermediate party at 515-565-5500. To illustrate the operation of the illustrative embodiment, suppose that the associated phone call constitutes the initial leg of a call looping transaction that is fraudulent. The first call is billed to billing number, 21345839485900, which for illustrative purposes, is presumed to be the number of a stolen calling card. Call record No. 4 shows that a call originated from the intermediate party at 515-565-5500, to a foreign party at 86-591-1938-4944. This call is an example of the second leg of a call looping transaction. The second call is billed to the intermediate party at 515-565-5500, and the originating party can make a call of international termination without being billed. The illustrative embodiment processes this call record data as described in more detail below to identify the call looping transaction and to prevent any further international calls originating from the intermediate party.

FIG. 5 is a block diagram that illustrates components of the detector 109 in more detail. The fraudulent call detector 109 detects fraudulent calls that are part of call looping transaction based on a call origination at a intermediate party. The call looping detector includes receiving buffers 501 and 503, a timer 505, a comparator 507 and an alarm 509. As described above, the exchange network generates call record data for each call and stores the generated call record data in a storage element. The buffers 501 and 503 receive the call record data from the storage element in the network. The terminating buffer 503 receives a terminating number of a first call originated from an originating party to an intermediate party. The originating buffer 503 also receive the originating number of a second call originated from the intermediate party to a terminating party. The timer 505 is used to calculate a time period from the first call to the second calls which are taken into account. The timer 505 sets forth a tolerance of a time difference between the first call and the second call. Generally, in call looping, the origination of the second call is made substantially at the same time of the termination of the first call. A comparator 507 compares the terminating number of a first call with the originating number of second calls which are originated within a time period set forth by the timer 505. If the terminating number of the first call is identical to the originating number of second calls which are originated within the time period set forth by the timer 505, the alarm 509 triggers a notification of an occurrence of a fraudulent telephone call to the exchange network.

Referring back to FIG. 4, if the timer is set to two minutes and call record No. 2 is received as information of a first call, call record No. 3 and No. 4 fall within the time period (i.e. two minutes). The terminating number 411 of the call shown at call record No. 2 is identical to the originating number 413 of the call shown at call record No. 4. According to the exemplary embodiment of the present invention shown in FIG. 5, the calls shown at call record No. 2 and No. 4 correspond to call looping and, therefore, the alarm 509 signifies the occurrence of a potentially fraudulent call.

Figure 6:
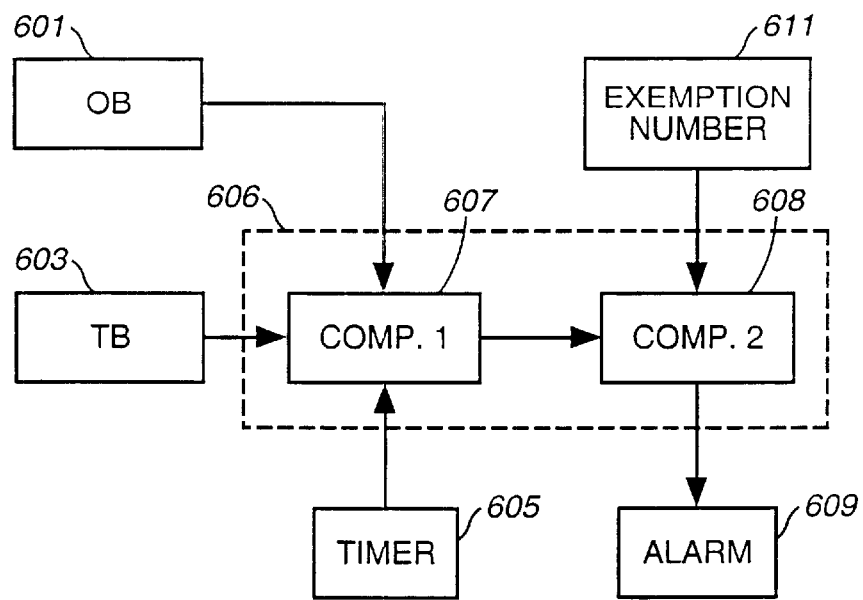
FIG. 6 is a block diagram which illustrates an alternative detector configuration.

FIG. 6 is an example of a block diagram which illustrates an alternative implementation of the fraudulent call detector 109. In FIGURE, the fraudulent call detector 109 also includes receiving buffers 601 and 603, a timer 605, a comparator 607, and an alarm 609. This implementation additionally includes a database 611 for storing telephone numbers which are exempted from the result of the embodiment shown in FIG. 5. In this case, the comparator 608 further compares the terminating number of a first call and the originating number of a second call with the telephone numbers stored in the exempted number database 611. Those of skill in the art will appreciate that the comparators 607 and 608 can be implemented in a processor 606 of a computer system. The alarm 609 notifies a fraudulent call only if the detected telephone number is not included in the exempted number database 611, even though the terminating number of the first call is identical to the originating number of second calls which are originated within the time period set forth by the timer 605. The exempted number database 611 is provided to prevent the calls placed by the legitimate customer from being determined as a fraudulent call pattern. Those skilled in the art will appreciate that the exempted number database may include a plurality of telephone numbers for legitimate use. For example, the exempted number database may include 1-8XX telephone numbers.

Figure 7:
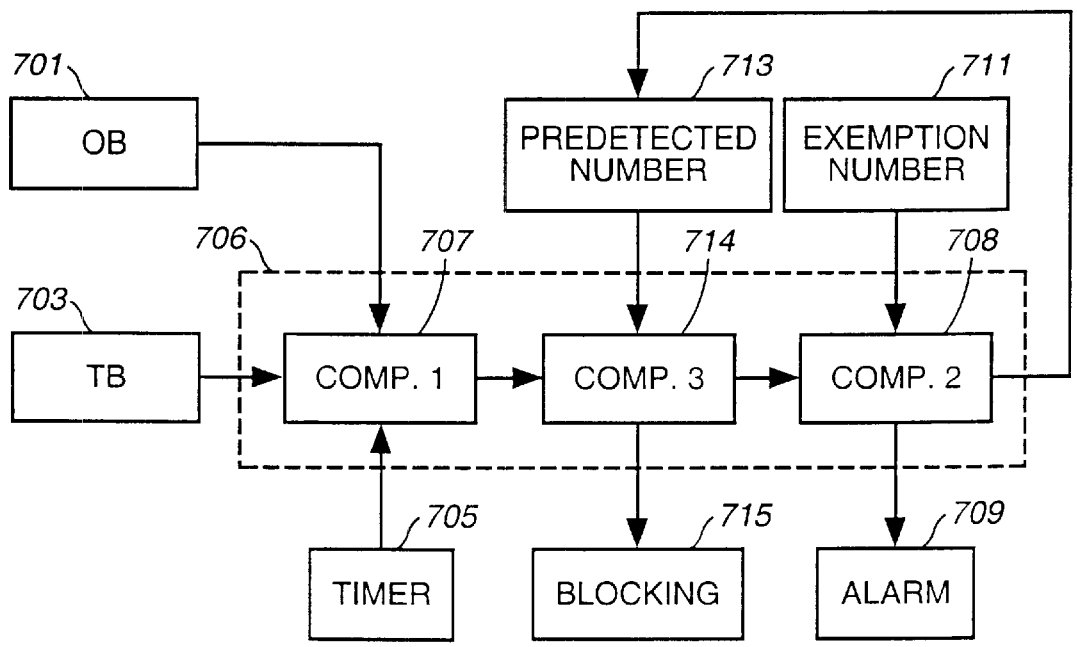
FIG. 7 is a block diagram which illustrates another extended embodiment of the present invention shown in FIGS. 5 and 6.

FIG. 7 is an example of a block diagram which illustrates another alternative implementation of fraudulent call detector 109. In FIG. 7, the fraudulent call detector also includes receiving buffers 701 and 703, a timer 705, comparators 707 and 708, an alarm 709 and an exempted number database 711. A storage element 713 is provided for storing a newly detected fraudulent telephone numbers. If the comparator 708 detects a fraudulent telephone call which is not exempted from a fraudulent call pattern, the detected telephone numbers are stored in the detected number database 713. The comparator 714 of the present embodiment, therefore, further compares the terminating number of the first call and the originating number of the second call with the previously detected fraudulent telephone numbers stored in the detected number database 713. If the comparator 714 find that the terminating number of the first call and the originating number of the second call are identical to the previously detected fraudulent telephone numbers stored in the detected number database 713, a blocking unit 715 puts blocks on the second call to prevent a fraudulent call from completing a desired call. As a result, this embodiment of the present invention has the effect of providing a real time reaction to prevent a fraudulent call from completing. Those of skill in the art will appreciate that the comparators 707, 708 and 714 can be implemented in a processor 706 of a computer system.

Figure 8:
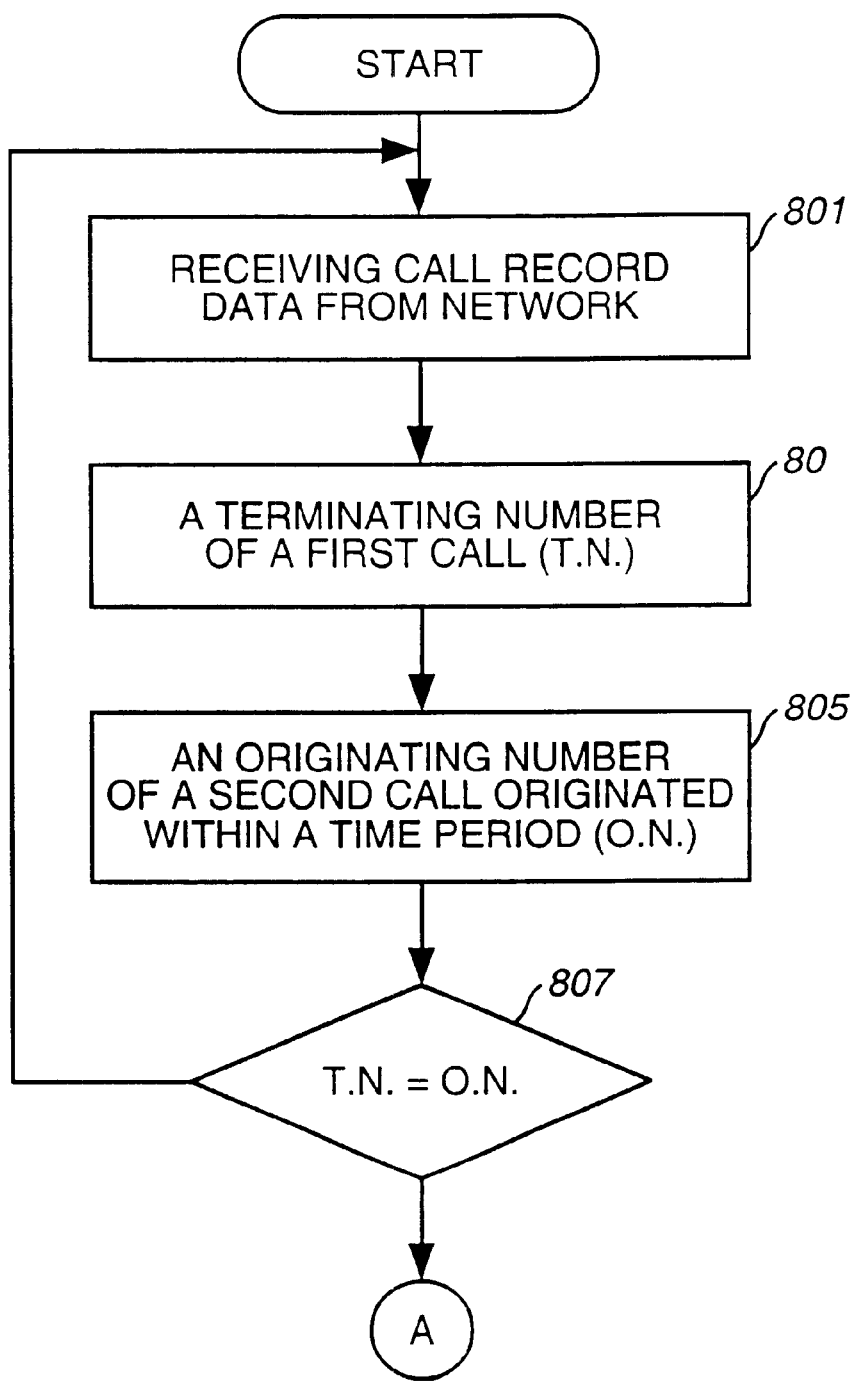
FIG. 8 is a flowchart of the steps performed in the illustrative embodiment to detect a fraudulent telephone call.

FIG. 8 is a flowchart of the steps performed in the illustrative embodiment of the present invention to detect a fraudulent telephone call. As described above, the exchange network generates call record data for each call and stores the generated data in a storage element. The detection method operates on the call record data. The first step is therefore, to provide the call record data (step 801). A terminating number of a first call originated from an originating party to an intermediate party is extracted from the call record data (step 803). Subsequently, the originating number of a second call originated from the intermediate party to a terminating party is extracted (step 805). The terminating number of the first call is then compared with the originating number of the second call which originated within a predetermined time period from the first call (step 807). Generally, the second call is originated substantially at the same time of a termination of the first call. If the terminating number of the first call and the originating number of the second call are the same, the illustrative embodiment concludes that a fraudulent call may have been placed.

Figure 9:
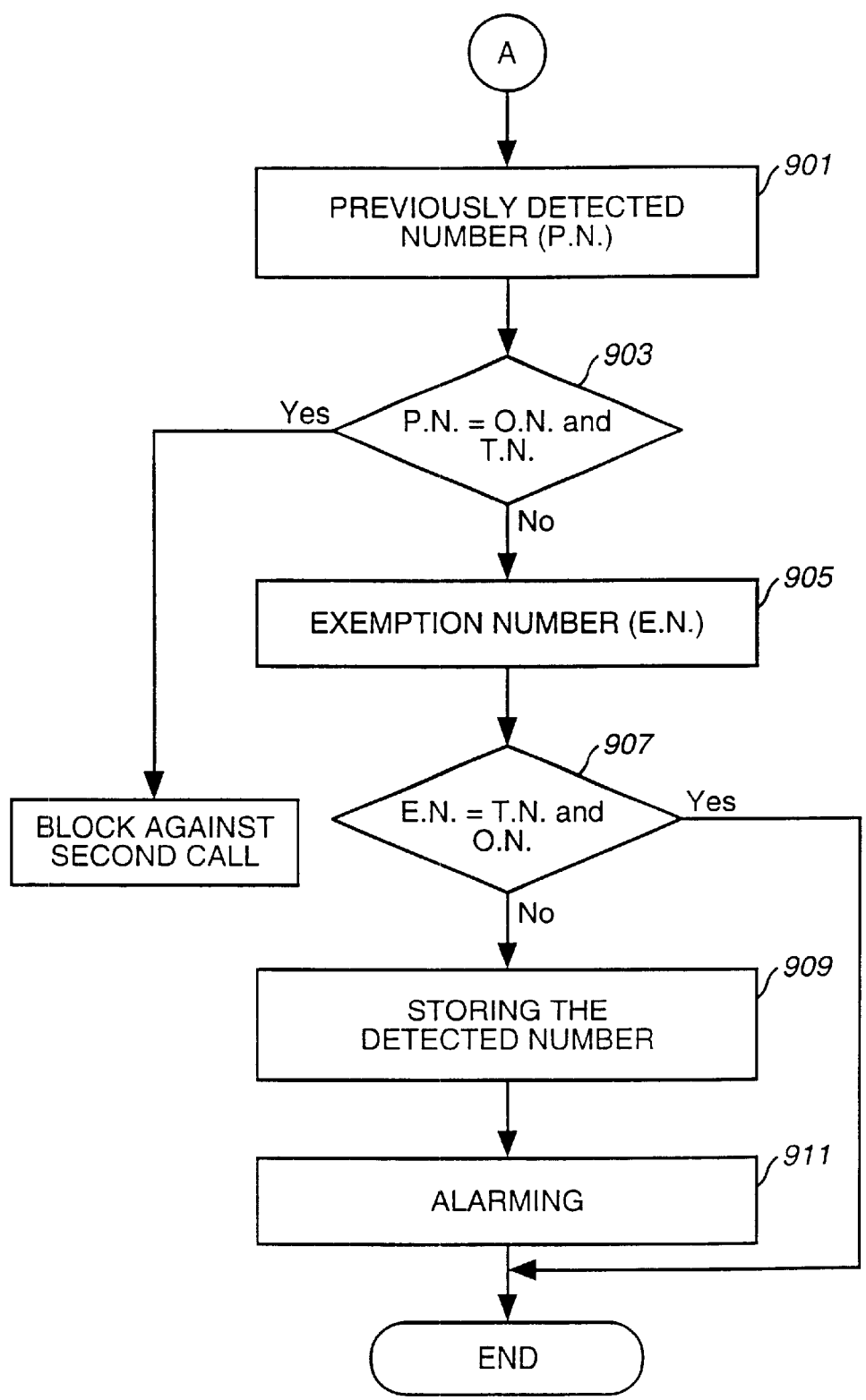
FIG. 9 is a flowchart of the steps that are performed when it is determined that the originating number is the same as the terminating number in step 807 of FIG. 8.

FIG. 9 is a flowchart of steps performed by the extensions of the illustrative embodiment that is depicted in FIGS. 6 and 7. This embodiment additionally includes the step of comparing the terminating number of the first call and the originating number of the second call with the exemption telephone numbers stored in the exempted number database (see FIG. 6), and the step of comparing the terminating number of the first call and the originating number of the second call with the previously detected fraudulent call numbers stored in the detected number database (see FIG. 7).

Where the originating number and the terminating number are the same and the associated calls are placed within the specified time limits, several steps are taken. First, the phone numbers involved in previous fraudulent transactions are loaded from the detected number database (step 901). The terminating number of the first call and the originating number of the second call which are originated within a time period are compared with the loaded numbers (step 903). If the terminating number of the first call and the originating number of the second call match the previously detected fraudulent telephone numbers stored in the detected number database, blocks are implemented to block the second call (step 913), and an alarm is sent to the network (step 911).

As mentioned above, exemption numbers may be referred. In order to use the exemption numbers, the exemption telephone numbers must be loaded from the exempted number database (step 905). The terminating number of the first call and the originating number of the second call are then compared with the exemption numbers (step 907). If the terminating number of the first call and the originating number of the second call match the exemption numbers, the embodiment of the present invention goes to the ending step, which means that no fraudulent call patterns are found. Otherwise, the terminating number of the first call which is identical to the originating number of the second call is stored in the detected number database to be compared in the next process (step 909). If a fraudulent call is found, the embodiment of the present invention alarms a fraudulent telephone call to a exchange network (step 911).

It is apparent that there has been provided, in accordance with the present invention, a method and system for detecting and preventing a fraudulent call based on the call record data. While this invention has been described in conjunction with illustrative embodiments thereof, it is evident that many alternatives, modifications, and variations will be apparent to those skilled in the art. For example, the present invention can be applied to a security monitoring system to detect an unauthorized access to the target system as well as to a telecommunication system to detect a telecommunication fraud. Accordingly, it is intended to embrace all such alternatives, modifications and variations that fall within the spirit and broad scope of the appended claims.

What is claimed is:

1. In a telecommunication system, a method for detecting and preventing a fraudulent telephone call, said method comprising the steps of:

provcall record data including an originating number and a terminating number of each call;

extracting call record data of a first call and a second call, said second call originating within a predetermined time period from a termination of the first call;

comparing the terminating number of the first call and the originating number of the second call; and determining a fraudulent telephone call pattern based on the comparison of said comparing step.

2. The method of claim 1 further comprising a step of notifying an occurrence of a fraudulent telephone call.

3. The method of claim 1 wherein said first call is a domestic long distance call.

4. The method of claim 1 wherein said second call is placed to international termination.

5. The method of claim 1 wherein the second call is originated substantially at the same time of a termination of the first call.

6. The method of claim 1 wherein said step of determining a fraudulent call comprises the step of comparing the terminating number of said first call and said originating number of said second call with exemption telephone numbers previously stored in a storage element.

7. The method of claim 6 wherein said exemption telephone numbers includes 1–8XX number.

8. The method of claim 1 further comprising the step of storing a newly detected fraudulent telephone numbers in a storage element.

9. The method of claim 8 wherein said comparing step further comprises the step of comparing the terminating number of the first call and the originating number of the second call with previously detected fraudulent telephone numbers stored in a storage element.

10. The method of claim 9 further comprising the step of blocking the second call.

11. In a computer system, a device for detecting and preventing a fraudulent telephone call, said device comprising:

a storage element for providing a terminating number of a first call and an originating number of a second call;

a timer for calculating a predetermined time period from said first call;

a processor for comparing said terminating number of said first call with said originating number of said second call originated within a predetermined time set forth by said timer.

12. The device of claim 11 further comprising an alarm for notifying a fraudulent telephone call based on said comparison of said terminating number of said first call with said originating number of said second call.

13. The device of claim 11 further comprising a second storage element for storing a database of telephone numbers which are exempted from a fraudulent telephone call pattern.

14. The device of claim 13 wherein said processor further comprises a means for comparing said exemption numbers with said terminating number of said first call and said originating number of said second call.

15. The device of claim 11 further comprising a third storage element storing phone numbers of a newly detected fraudulent call pattern.

16. The device of claim 15 wherein said processor further comprises a means for comparing said terminating number of said first call and said originating number of said second call with previously detected fraudulent telephone numbers stored in said third storage element.

17. The device of claim 16 further comprising:

a mechanism for blocking the second call based on the comparison of said first call and said originating number of said second call with previously detected fraudulent telephone numbers stored in said third storage element.

18. A computer program product for controlling a computer to detect and prevent a fraudulent telephone call, said program product comprising:

a recording medium readable by the computer means recorded on said recording means for generating a terminating number of a first call;

means recorded on said recording means for calculating a predetermined time period from said first call;

means recorded on said recording means for generating an originating number of a second call originated within the time period;

means recorded on said recording means for comparing said terminating number of said first call with said originating number of said second call; and means recorded on said recording means for alarming a fraudulent telephone call based on said comparison of said terminating number of said first call with said originating number of said second call.

* * * * *